US012699759B2

(12) United States Patent
Floury et al.

(10) Patent No.: US 12,699,759 B2
(45) Date of Patent: Aug. 4, 2026

(54) AUTHENTICATION METHOD USING ALTERED DATA AND CORRESPONDING ELECTRONIC DEVICE, COMPUTER PROGRAM PRODUCT AND MEDIUM

(71) Applicant: ORANGE, Issy-les-Moulineaux (FR)

(72) Inventors: Cédric Floury, Chatillon (FR); Mickael Le Trocquer, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 229 days.

(21) Appl. No.: 18/549,633

(22) PCT Filed: Mar. 15, 2022

(86) PCT No.: PCT/FR2022/050460
§ 371 (c)(1),
(2) Date: Sep. 8, 2023

(87) PCT Pub. No.: WO2022/195213
PCT Pub. Date: Sep. 22, 2022

(65) Prior Publication Data
US 2024/0152595 A1 May 9, 2024

(30) Foreign Application Priority Data
Mar. 16, 2021 (FR) ...................................... 2102589

(51) Int. Cl.
*G06F 21/36* (2013.01)

(52) U.S. Cl.
CPC .................................... *G06F 21/36* (2013.01)

(58) Field of Classification Search
CPC .................................. G06F 21/36; H04L 63/08
See application file for complete search history.

(56) References Cited

U.S. PATENT DOCUMENTS

| | | |
|---|---|---|
| 7,174,462 B2 | 2/2007 | Pering et al. |
| 2002/0029341 A1* | 3/2002 | Juels ..................... H04L 63/083 713/184 |

(Continued)

FOREIGN PATENT DOCUMENTS

WO WO-2013118302 A1 * 8/2013 ............. G06F 21/36

OTHER PUBLICATIONS

Timón López C, Alamillo Alamillo Domingo I, Valero Valero Torrijos J. Which authentication method to choose. A legal perspective on user-device authentication in IoT ecosystems. InProceedings of the 16th International Conference on Availability, Reliability and Security Aug. 1, 20217 (pp. 1-6). (Year: 2021).*

(Continued)

*Primary Examiner* — James R Turchen
(74) *Attorney, Agent, or Firm* — David D. Brush; Westman, Champlin & Koehler, P.A.

(57) ABSTRACT

A method including: providing, on an output user interface of an electronic device, data including an audio sequence and/or an image, the provided data including a first and a second datum, the provided first datum being obtained by altering a third datum associated with a user account, the provided second datum being an unaltered datum or portion of a datum associated with the user account; designating one of the provided data via an input user interface; authenticating access to the user account from the electronic device based on a proximity between the designated datum and the provided first and/or second datum. A related electronic device, computer program product and corresponding medium.

20 Claims, 3 Drawing Sheets

(56) References Cited

U.S. PATENT DOCUMENTS

| | | | | |
|---|---|---|---|---|
| 2004/0053654 | A1* | 3/2004 | Kokumai | G06F 21/36 |
| | | | | 463/1 |
| 2006/0179488 | A1* | 8/2006 | Kokumai | G11B 20/00086 |
| | | | | 726/28 |
| 2009/0328175 | A1* | 12/2009 | Shuster | H04L 9/3226 |
| | | | | 726/7 |
| 2011/0154482 | A1* | 6/2011 | Heiner | G06F 21/36 |
| | | | | 726/19 |
| 2014/0130148 | A1* | 5/2014 | Sako | G06F 21/36 |
| | | | | 726/19 |
| 2014/0250510 | A1* | 9/2014 | Shuster | H04L 63/0861 |
| | | | | 726/6 |
| 2017/0017784 | A1* | 1/2017 | McFarland | H04L 63/10 |
| 2018/0349579 | A1* | 12/2018 | Allouche | G06F 21/31 |

OTHER PUBLICATIONS

English translation of the Written Opinion of the International Searching Authority dated May 23, 2022 for corresponding International Application No. PCT/FR2022/050460, filed Mar. 15, 2022.

Yamamoto T et al., "Advantages of User Authentication Using Unclear Images Automatic Generation of Decoy Images", Advanced Information Networking and Applications, 2009. AINA '09. International Conference On, IEEE, Piscataway, NJ, USA,May 26, 2009 (May 26, 2009), p. 668-674, XP031476165.

International Search Report dated May 23, 2022 for corresponding International Application No. PCT/FR2022/050460, filed Mar. 15, 2022.

Written Opinion of the International Searching Authority dated May 23, 2022 for corresponding International Application No. PCT/FR2022/050460, filed Mar. 15, 2022.

* cited by examiner

AUTHENTICATION METHOD USING ALTERED DATA AND CORRESPONDING ELECTRONIC DEVICE, COMPUTER PROGRAM PRODUCT AND MEDIUM

CROSS-REFERENCE TO RELATED APPLICATIONS

This Application is a Section 371 National Stage Application of International Application No. PCT/FR2022/050460, filed Mar. 15, 2022, which is incorporated by reference in its entirety and published as WO 2022/195213 A1 on Sep. 22, 2022, not in English.

TECHNICAL FIELD

The present application relates to the field of access authentications via electronic means.

It relates in particular to an authentication method, and also to a corresponding electronic device, computer program product and medium.

PRIOR ART

Many applications giving access to a software and/or hardware resource, such as a user account accessible via an electronic device, a secure portion of a building, and/or an object with restricted access, require a user to authenticate themselves in order to validate a right of access to this resource. Depending on the applications, the authentication mechanisms may be more or less sophisticated. Some are based for example on a password, dual authentication, and/or facial and/or fingerprint recognition. Although at least some of these solutions are reliable, they may prove tricky to implement. Thus, some solutions may require specific sensors or even require significant memory effort from a user to be authenticated in order to remember increasingly complex passwords.

The present application aims to propose improvements to at least some of the drawbacks from the prior art.

SUMMARY OF THE INVENTION

The present application aims to improve the situation, according to a first aspect, by way of a method comprising:
 providing, on at least one output user interface of an electronic device, a plurality of data comprising at least one audio sequence and/or sequence of at least one image, at least a first of said provided data being obtained by altering at least one datum associated with a user account;
 receiving a designation, via at least one input user interface, of at least one of said provided data;
 authenticating access to said user account from said electronic device on the basis of a proximity between said at least one designated datum and said at least one datum associated with said user account.

A datum, in the present application, is understood to mean a datum able to be output (or rendered) via an output interface of an electronic device, such as an audio datum and/or an image datum (drawing, photograph, video), or a combination of such elements.

According to the present application, altering a datum is understood to mean at least one transformation made to the datum. A transformation may for example correspond to addition of a complementary datum to the datum. For example, for an image datum, this may involve the addition of a character or an object to the image. Similarly, a sound (character voice, or sound from at least one object) may be added to an audio datum. The added datum may represent for example a person unknown to the user, or known to the user but whose presence is incongruous in the audio sequence and/or image sequence that the datum comprises. According to another example, a transformation may correspond to a modification of an element present in the audio sequence and/or image sequence. This may involve a change in the color or the shape of an element present in an image sequence, or a modulation of a sound in an audio sequence. A transformation may also correspond to obscuring (or masking) or blurring of part of an image sequence, adding noise to part of an audio sequence and/or truncation of the (audio or image) datum. Altering a datum may of course comprise multiple different transformations (such as addition of a first character and modification of a second character) in some embodiments.

According to at least one embodiment, the method comprises obtaining said at least one datum associated with said user account from a storage space accessible from said user account.

According to at least one embodiment, said obtaining of said at least one datum associated with said user account takes into account the presence, in the data from said storage space, of a content element of said datum associated with said user account.

According to at least one embodiment, said obtaining of said at least one datum associated with said user account takes into account a history of access to and/or history of rendering of said at least one datum associated with said user account. According to at least one embodiment, said at least one datum associated with said user account is contained at least partially within said provided data.

According to at least one embodiment, the method comprises partially rendering, on said output user interface, at least one other datum associated with said user account and comprising an audio sequence and/or a sequence of at least one image, said plurality of provided data having a form and/or a length able to be substituted for an unrendered part of said other datum.

According to at least one embodiment, said partially rendered other datum comprises said datum associated with said user account.

According to at least one embodiment, said provided first datum comprises at least a first portion not belonging to said datum associated with said user account or vice versa.

According to at least one embodiment, the provided data comprise at least one other datum able to be inserted into said provided first datum as a substitute for an altered portion of said datum associated with said user account in said first datum. According to at least one embodiment, said access to a user account is an access to a software application accessible from said electronic device.

According to at least one embodiment, said access is authenticated when said designated datum corresponds to said at least one datum associated with said user account.

According to at least one embodiment, said access is authenticated when said designated datum does not correspond to any of said at least one datum associated with said user account.

The present application also relates to an authentication method comprising:
 providing, on at least one output user interface of an electronic device, a plurality of data comprising at least one audio sequence and/or sequence of at least one image, said plurality of provided data comprising at least one first datum and at least one second datum, said at least one provided first datum being obtained by altering at least one third datum associated with a user account, said at least one provided second datum being an unaltered datum or an unaltered datum portion, associated with said user account;

receiving a designation, via at least one input user interface, of at least one datum of said plurality of provided data;

authenticating access to said user account from said electronic device on the basis of a proximity between said at least one designated datum and said at least one provided first and/or second datum.

According to at least one embodiment, the method comprises obtaining said at least one second and/or third datum associated with said user account from a storage space accessible from said user account.

According to at least one embodiment, said obtaining of said at least one second and/or third datum associated with said user account takes into account the presence, in the data from said storage space, of a content element of said second and/or third datum associated with said user account.

According to at least one embodiment, said obtaining of said at least one second and/or third datum associated with said user account takes into account a frequency of presence of said content element in the data from said storage space.

According to at least one embodiment, said obtaining of said at least one second and/or third datum associated with said user account takes into account a history of access to and/or history of rendering of said at least one second and/or third datum associated with said user account.

According to at least one embodiment, said at least one third datum associated with said user account is contained at least partially within said provided data.

According to at least one embodiment, the method comprises partially rendering, on said output user interface, at least one fourth datum associated with said user account and comprising an audio sequence and/or a sequence of at least one image, said plurality of provided data having a form and/or a length able to be substituted for an unrendered part of said fourth datum.

According to at least one embodiment, said partially rendered fourth datum is said third datum associated with said user account.

According to at least one embodiment, said provided first datum comprises at least a first portion not belonging to said third datum associated with said user account or vice versa.

According to at least one embodiment, the provided data comprise at least one fifth datum able to be inserted into said provided first datum as a substitute for an altered portion of said third datum associated with said user account in said first datum. According to at least one embodiment, said method comprises obtaining, prior to said provision, data from said storage space by filtering data collected from another storage space.

According to at least one embodiment, said obtaining of data from said storage space comprises identifying at least one content element of at least one of the collected data.

According to at least one embodiment, said access to be authenticated is access to a software application accessible from said electronic device.

According to at least one embodiment, said access is authenticated when said designated datum corresponds to said at least one second datum.

According to at least one embodiment, said access is authenticated when said designated datum corresponds to said first datum.

According to at least one embodiment, said provision is implemented upon entry of a user identifier.

According to at least one embodiment, said provision is implemented in addition to a password-based authentication mechanism.

Features that are presented separately in the present application, in connection with certain embodiments of the method of the present application, may be combined together into other embodiments of this method.

According to another aspect, the present application relates to an electronic device able to implement the method of the present application in any one of its embodiments. For example, the present application relates to an electronic device comprising at least one processor configured for:

providing, on at least one output user interface of an electronic device, a plurality of data comprising at least one audio sequence and/or sequence of at least one image, at least a first of said provided data being obtained by altering at least one datum associated with a user account;

receiving a designation, via at least one input user interface, of at least one datum of said plurality of provided data;

authenticating access to said user account from said electronic device on the basis of a proximity between said at least one designated datum and said at least one datum associated with said user account.

For example, the present application relates to an electronic device comprising at least one processor configured for:

providing, on at least one output user interface of said electronic device, a plurality of data comprising at least one audio sequence and/or sequence of at least one image, said plurality of provided data comprising at least one first datum and at least one second datum, said at least one provided first datum being obtained by altering at least one third datum associated with a user account, said at least one provided second datum being an unaltered datum or an unaltered datum portion, associated with said user account;

receiving a designation, via at least one input user interface, of at least one datum of said plurality of provided data;

authenticating access to said user account from said electronic device on the basis of a proximity between said at least one designated datum and said at least one provided first and/or second datum.

The present application also relates to a computer program comprising instructions for implementing the various embodiments of the above method when the computer program is executed by a processor, and to a recording medium able to be read by an electronic device and on which the computer program is recorded.

For example, the present application relates to a computer program comprising instructions for implementing, when the computer program is executed by a processor of an electronic device, a method comprising:

providing, on at least one output user interface of an electronic device, a plurality of data comprising at least one audio sequence and/or sequence of at least one image, at least a first of said provided data being obtained by altering at least one datum associated with a user account;

receiving a designation, via at least one input user interface, of at least one of said provided data;

authenticating access to said user account from said electronic device on the basis of a proximity between said at least one designated datum and said at least one datum associated with said user account.

For example, the present application relates to a computer program comprising instructions for implementing, when the computer program is executed by a processor of an electronic device, a method comprising:

providing, on at least one output user interface of said electronic device, a plurality of data comprising at least one audio sequence and/or sequence of at least one image, said plurality of provided data comprising at least one first datum and at least one second datum, said at least one provided first datum being obtained by altering at least one third datum associated with a user account, said at least one provided second datum being an unaltered datum or an unaltered datum portion, associated with said user account;

receiving a designation, via at least one input user interface, of at least one datum of said plurality of provided data;

authenticating access to said user account from said electronic device on the basis of a proximity between said at least one designated datum and said at least one provided first and/or second datum.

Moreover, the present application relates for example to a recording medium able to be read by a processor of an electronic device and on which there is recorded a computer program comprising instructions for implementing, when the computer program is executed by the processor, a method comprising:

providing, on at least one output user interface of an electronic device, a plurality of data comprising at least one audio sequence and/or sequence of at least one image, at least a first of said provided data being obtained by altering at least one datum associated with a user account;

receiving a designation, via at least one input user interface, of at least one of said provided data;

authenticating access to said user account from said electronic device on the basis of a proximity between said at least one designated datum and said at least one datum associated with said user account.

For example, the present application relates to a recording medium able to be read by a processor of an electronic device and on which there is recorded a computer program comprising instructions for implementing, when the computer program is executed by the processor, a method comprising:

providing, on at least one output user interface of said electronic device, a plurality of data comprising at least one audio sequence and/or sequence of at least one image, said plurality of provided data comprising at least one first datum and at least one second datum, said at least one provided first datum being obtained by altering at least one third datum associated with a user account, said at least one provided second datum being an unaltered datum or an unaltered datum portion, associated with said user account;

receiving a designation, via at least one input user interface, of at least one datum of said plurality of provided data;

authenticating access to said user account from said electronic device on the basis of a proximity between said at least one designated datum and said at least one provided first and/or second datum.

The abovementioned information media may be any entity or device capable of storing the program. For example, a medium may include a storage means, such as a ROM, for example a CD-ROM, or a microelectronic circuit ROM, and/or a magnetic recording means.

Such a storage means may be for example a hard disk, a flash memory, etc. Moreover, an information medium may be a transmissible medium such as an electrical or optical signal, which may be routed via an electrical or optical cable, by radio or by other means. A program according to the invention may in particular be downloaded from a network such as the Internet.

Alternatively, an information medium may be an integrated circuit into which a program is incorporated, the circuit being able to execute or to be used in the execution of any one of the embodiments of the method forming one subject of the present patent application.

In general, in the present application, obtaining an element is understood to mean for example receiving this element from a communication network, acquiring this element (via for example user interface elements or sensors), creating this element by various processing means such as by copying, encoding, decoding, transformation etc. and/or accessing this element from a local or remote storage medium accessible to at least one device at least partially implementing this obtaining.

BRIEF DESCRIPTION OF THE DRAWINGS

Other features and advantages of the invention will become more clearly apparent on reading the following description of particular embodiments, which are given by way of simple illustrative and non-limiting examples, and the appended drawings, in which.

DESCRIPTION OF THE EMBODIMENTS

The present application aims to offer a simple way of authenticating at least one user by exploiting the capacities of a human brain to remember experienced moments and/or to recognize close contacts with whom they have shared such moments. Humans thus generally have a capacity to recognize, often very quickly, beings who they know (for example close contacts) in photos, based for example on facial features, expressions, contexts experienced together, etc. Similarly, individuals are also able to identify known beings or places via an audio sample, for example.

In addition, the set of beings known (such as public figures or close contacts such as friends, family members, colleagues, or even pets) by an individual is specific to this individual. Each individual thus remembers places in life that, as a whole, are specific to them. The present application proposes to use audio and/or visual elements representative of these sets of beings or places specific to an individual to authenticate this individual.

More specifically, according to the present application, an authentication of a user may for example be based on a distinction, made by this user, between audio (or data) and/or image elements, considered to be known to the user, from among a set of audiovisual elements comprising at least one audio and/or image element, referred to as "virtual" element, obtained by altering a known element.

The known data may for example represent living beings (humans or animals), objects or places, and come from a storage space associated with (or even dedicated to) the user. For example, the known data may come from a knowledge base personal to the user, such as an audio base, an image base and/or video base.

For the sake of simplicity, the present invention is presented in more detail below with reference to embodiments that are cited by way of non-limiting examples, which relate to data specific to a single user. Other embodiments of the present application may allow authentication of at least one member of a group of users, by virtue of data specific to this group. The group of users may correspond to a professional group (a project team for example), to a group of friends, neighbors, or to the members of a family, an association, a sports club, a company, and/or a community. In the case of a group of users, according to the embodiments, the known data may belong to the group (a logo of the group for example) or to at least one individual in the group. This may in particular involve data from one or more individuals in the group likely to be recognized or at least evaluated (in terms of veracity and/or likelihood) by all of the members of the group. For example, this may involve photos of a sports competition taken by one of the members of a sports club, the competition taking place on the premises of the club and/or between the members of the club.

The present application will now be described in more detail with reference to FIG. 1.

Figures 1, 2:
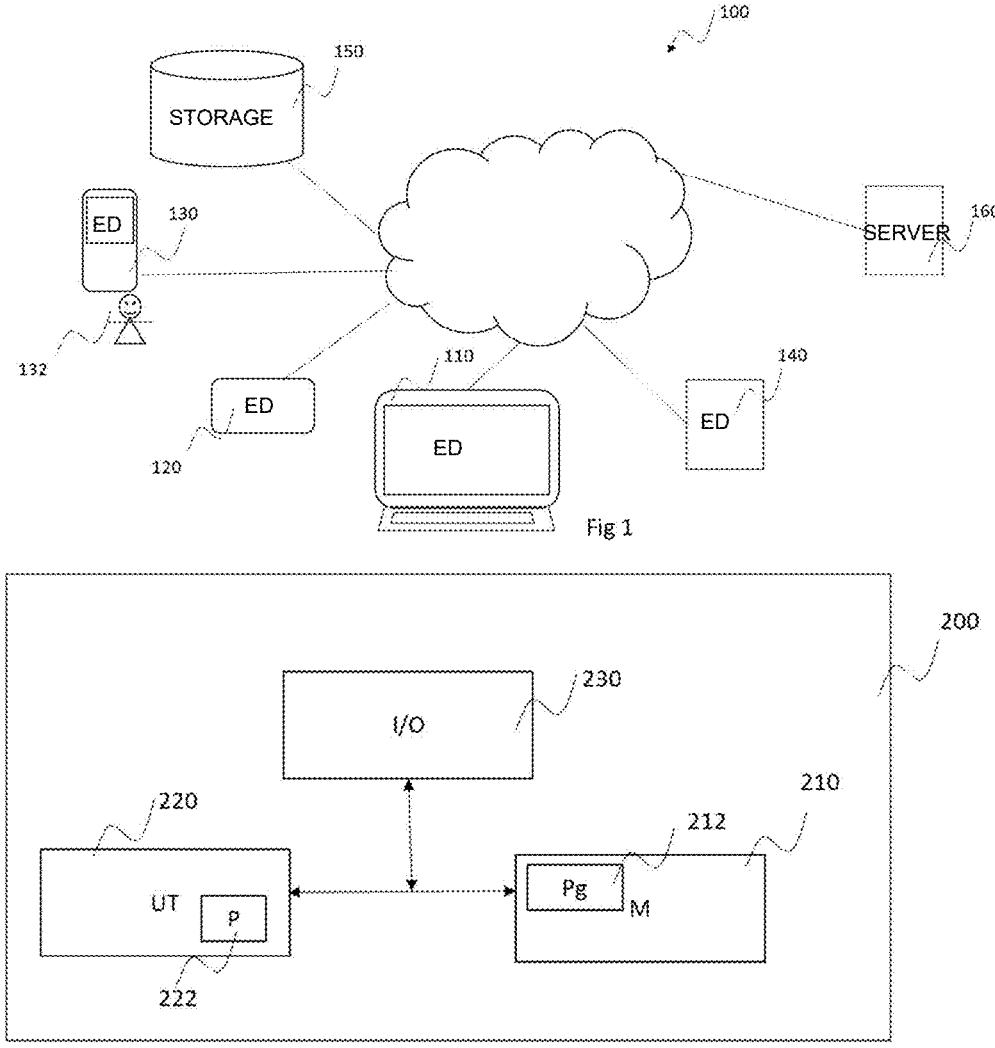
FIG. 1 presents a simplified view of a system, cited by way of example, in which at least some embodiments of the authentication method of the present application may be implemented.
FIG. 2 presents a simplified view of a device able to implement at least some embodiments of the authentication method of the present application.

FIG. 1 shows a telecommunications system 100 in which some embodiments of the invention may be implemented. The system 100 comprises one or more electronic devices, at least some of which are able to communicate with one another via one or more, optionally interconnected, communication networks, such as a LAN (Local Area Network) and/or a WAN (Wide Area Network). For example, the network may comprise a business or domestic LAN and/or an Internet WAN or cellular WAN, GSM—Global System for Mobile Communications, UMTS—Universal Mobile Telecommunications System, Wi-Fi—Wireless, etc.

As illustrated in FIG. 1, the system 100 may also comprise multiple electronic devices, such as a terminal (such as a laptop computer 110, a tablet 120, a smartphone 130, or a device 140 restricting access to a hardware resource (portal, safe, etc.), a storage device 150 and/or a server 160, for example an application server, such as an application for providing or altering audiovisual content. The system may also comprise network management and/or interconnection elements (not shown). Some of these electronic devices may be associated with at least one individual 132 (for example through a user account accessible by login), some of the electronic devices 110, 130 possibly being associated with one and the same user 132.

FIG. 2 illustrates a simplified structure of an electronic device 200 able to implement the principles of the present application, for example the device 110, 120, 130 or 140 of the system 100 illustrated in FIG. 1. Depending on the embodiments, this may be a server, and/or a terminal.

The device 200 comprises in particular at least one memory M 210. The device 200 may in particular comprise a buffer memory, a volatile memory, for example a RAM (Random Access Memory), and/or a non-volatile memory, a ROM (Read-Only Memory) for example. The device 200 may also comprise a processing unit UT 220, equipped for example with at least one processor P 222, and controlled by a computer program Pg 212 stored in the memory M 210. On initialization, the code instructions of the computer program Pg are for example loaded into a RAM before being executed by the processor P. The at least one processor P 222 of the processing unit UT 220 may in particular implement, individually or collectively, any one of the embodiments of the method of the present application (described in particular with reference to FIG. 3), according to the instructions of the computer program Pg 212.

The device may also comprise, or be coupled to, at least one I/O (input/output) module 230, such as a communication module, for example allowing the device 200 to communicate with other devices of the system 100, via wired or wireless communication interfaces, and/or such as a module for interfacing with a user of the device (also more simply referred to as "user interface" in this application). A user interface of the device is understood to mean for example an interface integrated into the device 200, or part of a third-party device coupled to this device by wired or wireless communication means. For example, this may be a secondary screen of the device or a set of loudspeakers connected by wireless technology to the device. A user interface may in particular be what is referred to as an "output" user interface, able to render (or to control rendering of) at least one output element of a computer application used by the device 200, for example an application running at least partially on the device 200 or an "online" application running at least partially remotely, for example on the server 140 of the system 100. Rendering is understood here to mean an output on at least one user interface, in any form, for example comprising a textual component, an audio component, an image component, and/or a video component, or a combination of such components.

Examples of an output user interface of the device include one or more screens, in particular at least one graphics screen (a touchscreen for example), one or more loudspeakers, and a connected headset.

Moreover, a user interface may be what is referred to as an "input" user interface, able to acquire information from a user of the device 200. This may in particular be information intended for a computer application accessible via the device 200, for example an application running at least partially on the device 200 or an "online" application running at least partially remotely, for example on the server 140 of the system 100. Examples of an input user interface of the device 200 include a sensor, a means for acquiring audio and/or video (microphone, camera (webcam) for example), a keyboard, and a mouse.

In some embodiments, the at least one microprocessor of the device 200 may for example be able to:
  provide, on at least one output user interface of an electronic device, a plurality of data comprising at least one audio sequence and/or sequence of at least one image, at least a first of the provided data being obtained by altering at least one datum associated with a user account;
  receive a designation, via at least one input user interface, of at least one of the provided data;
  authenticate access to said user account from the electronic device on the basis of a proximity between the at least one designated datum and the at least one datum associated with the user account.

In some embodiments, the at least one microprocessor of the device 200 may for example be able to:

provide, on at least one output user interface of the electronic device, a plurality of data comprising at least one audio sequence and/or sequence of at least one image, the plurality of provided data comprising at least one first datum and at least one second datum, the at least one provided first datum being obtained by altering at least one third datum associated with a user account, the at least one provided second datum being an unaltered datum or an unaltered datum portion, associated with said user account;

receive a designation, via at least one input user interface, of at least one datum of said plurality of provided data;

authenticate access to the user account from the electronic device on the basis of a proximity between the at least one designated datum and the at least one provided first and/or second datum.

Some of the above input-output modules are optional and may therefore be absent from the device 200 in some embodiments. In particular, although the present application is sometimes detailed in connection with a device communicating with at least one second device of the system 100, the method may also be implemented locally by a device, when it uses a library of personal elements stored on a storage medium local to the device for example.

In contrast, in some of its embodiments, the method may be implemented in a distributed manner (for example between at least two devices 110, 120, 130, 140, 150 and/or 160 of the system 100).

Figure 3:
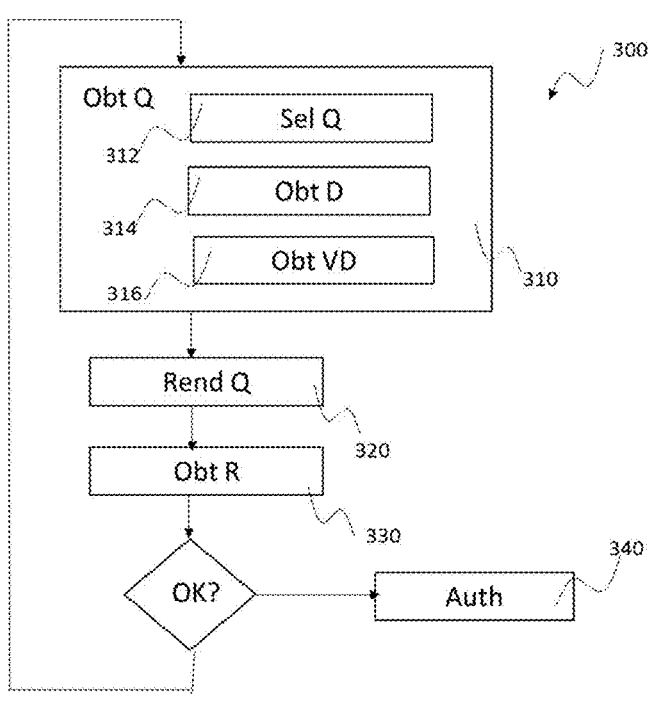
FIG. 3 presents an overview of the authentication method of the present application, in some of its embodiments, FIG. 4 details certain steps of the authentication method from FIG. 3, in some of its embodiments.

The term "module" or the term "component" or "element" of the device is understood here to mean a hardware element, in particular a wired hardware element, or a software element, or a combination of at least one hardware element and of at least one software element. The method according to the invention may therefore be implemented in various ways, in particular in wired form and/or in software form. FIG. 3 illustrates some embodiments of the authentication method 300 of the present application. The method 300 may for example be implemented by the electronic device 200 illustrated in FIG. 2.

The authentication method may in particular be implemented to secure access to an electronic, software or hardware resource, or to a physical resource (such as a place with restricted access). According to the embodiments, the authentication method may be implemented systematically, upon entry of a user identifier for example, or conditionally, for example following configuration of the electronic device by a user to give preference to such authentication, or in addition to another authentication mechanism (based on entering a password for example), such as in the event of forgetting passwords.

As illustrated in FIG. 3, the method 300 comprises obtaining 310 a puzzle to be solved in connection with data associated with the user account to be authenticated (for example elements that are personal and/or known to a person to whom this user account is assigned). A puzzle may correspond to a statement (in other words, a request or a scenario), for example a question relating (or applicable) in particular to at least one datum associated with the user account. Access authentication is dependent on the response given to the request. The statement may also be linked to data (for example virtual data) other than that/those associated with the user account.

For example, the statement in a puzzle may be a passage of text such as ("Choose the photograph that corresponds to one of your contacts" or "One of the photographs shown has been retouched. You must choose this photograph"). Obtaining 310 a puzzle may comprise a step of selecting 312 a statement. This step is optional. Thus, in some embodiments, only a single statement may be provided, which may apply to various data. In other embodiments, multiple different statements may be possible. These may for example be chosen in a configuration file between N statements (where N is a strictly positive integer), randomly and/or via a user selection or automatically. The statements may also be constructed based on parameters of a configuration file. The configuration file may optionally be write-accessible to a user once authenticated, or to an administrator.

The data associated with the user account may, in some embodiments, be obtained from a library (or knowledge base) dedicated to the user account to be authenticated. This dedicated library may for example have been constructed and/or enriched prior to obtaining 310 a puzzle. For example, as illustrated in FIG. 5, the dedicated knowledge base 540 may have been constructed and/or enriched during prior training 500 (not illustrated in FIG. 3).

Figure 5:
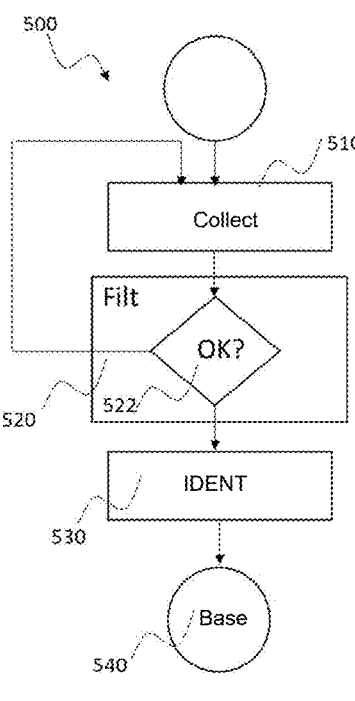
FIG. 5 presents one example of enrichment of a library (or knowledge base) of elements known to a user to be authenticated and able to be used by the authentication method of the present application, in some of its embodiments, FIG. 6 details certain steps of the authentication method from FIG. 3, in some of its embodiments.

In the embodiment of FIG. 5, the prior training 500 may comprise for example collecting 510 data (photographs in the example illustrated) from at least one other storage space associated with the user account. This may be a local storage space and/or a remote storage space (for example a "cloud" online storage space, such as an online storage space linked to a social network). The training 500 may comprise filtering 520 the collected data. Indeed, these data are intended to be output on a user interface and therefore to be potentially accessible to a third party. For example, as illustrated in FIG. 5, permission 522 to use a collected datum may be obtained via a user interface. In other embodiments, the filtering 520 may be based on applying configurable rules. For example, the filtering may make it possible not to retain, in the collected data, data that are considered to be personal or confidential. The filtering 520 may be performed at least partially automatically, by applying filtering rules, such as rejecting collected data representing naked characters, festive atmospheres, or children, or data associated (by metadata for example) with key words (for example, "personal", "confidential", "private", etc.) indicative of an excessively personal or confidential nature of a datum.

The training may also comprise identifying 530 a content element represented on and/or by a collected datum. This may be a face or a voice of a person contained in a collected datum. In the same way, this may be a form or a sound able to be identified as relating to an object and/or a place. This identification may be carried out "manually" by interrogating a user, or automatically. For example, in some embodiments, the identification may use at least one annotation or at least one metadatum associated with the collected datum. In some embodiments, the identification may implement facial detection modules and/or image classification modules and/or audio sample classification modules (for example at least one neural network trained for this purpose).

According to the embodiments, the training 500 may be carried out one or more times to enrich and improve the knowledge base 540. For example, it may be carried out upon initialization of the authentication method 300. It may also be carried out multiple times (regularly, randomly, or depending on a context of the device (such a load of a battery of the device, and/or a connection to a communication network, and/or an access to a remote storage space)).

The training 500 may furthermore comprise evaluating a user's knowledge of an identified content element. This involves evaluating for example whether or not a contact of the user is a close contact of said user. In some embodiments, this knowledge may for example be evaluated taking into account a number of identifications of one and the same content element (such as a face of the contact) in data from the knowledge base. Indeed, it is expected that a user will have in their possession more audio data or images representing beings, objects or places that are close to them than other beings, objects or places about which they know little or even nothing at all. In one variant, this knowledge may be evaluated taking into account a frequency of occurrence of the content element in the data from the knowledge base.

In some embodiments, the knowledge of a datum may be evaluated taking into account a history of access to this datum. Indeed, it may be expected that a user who frequently plays back an audio or image datum knows this datum better than a datum that is rarely output.

In the example of FIG. 3, obtaining 310 a puzzle to be solved in connection with data associated with the user account to be authenticated comprises obtaining 314 at least one datum associated with the user account to be authenticated, for example from the knowledge base introduced above in connection with FIG. 5. Obtaining 314 a datum associated with the user account from the knowledge base may comprise selecting the associated datum. According to the embodiments, this may involve a random selection for example, or a selection taking into account at least one criterion, for example the users knowledge of a datum (taking into account a number or frequency of occurrence of the content elements represented by the datum in the knowledge base or a history of access to this datum for example). It is also possible for the authentication method 300 to take into account a history of use of the associated datum. Indeed, giving preference to data that have not been recently used by the authentication method may help to protect against attacks from a third party that has been able to memorize choices made by a user during previous authentications in the presence of this third party. In some embodiments, the selection may also take into account features of the content elements, so as to select only certain content elements (faces or heads of animals for example). In the example illustrated in FIG. 3, obtaining 310 a puzzle may also comprise obtaining 316 a virtual datum, obtained by altering a datum associated with the user account. The virtual datum may for example have been generated prior to the implementation of the authentication method and be stored in a dedicated library, in association for example with the altered datum. For example, in some embodiments, this may be a virtual datum created during a previous implementation of the authentication method and/or during an initialization phase, comprising for example creating a set of virtual elements for subsequent use.

At least one virtual datum may also be generated on the fly from one of the data associated with the user account that are obtained 314 during the implementation of the authentication method. In such an embodiment, the method may comprise storing the at least one generated virtual datum, in association for example with the datum from which it is altered.

According to the embodiments, the alteration made to a datum may vary. For example, it may be a modification of an element contained in a datum associated with the user account. In particular, some embodiments may implement at least one person detection and/or face modification algorithm (to act for example on certain parameters for aging and/or rejuvenating a face, or even for obtaining a face by crossing over features from multiple different faces).

In some embodiments, the alterations may be obtained by an artificial intelligence module, so as to have plausible virtual data that are sufficiently close to the real photographs so as to make it difficult for a third party to distinguish the two types of photographs.

For example, the face may be obtained by using various types of style features of various faces. The face may thus use coarse style features of a first face, "middle" style features, and "fine" style features of a third face, for example features obtained via convolution matrices of a neural network (for example a matrix of dimension $4^2$ to $16^2$ for coarse style features, of dimension $16^2$ to $32^2$ for "middle" style features and of dimension $64^2$ to $1024^2$ for "fine" style features.

In the example of FIG. 3, the method comprises rendering 320 the puzzle to be solved.

For example, multiple photographs are output (rendered) on a screen coupled to the device 200, at least a first one of the presented photographs being a known photograph, or part of a known photograph, obtained 314 from a knowledge base constructed from a library of photographs of the user, and at least a second one of the presented photographs being a "virtual" photograph, not belonging to a library of photographs of the user. The "virtual" photograph may correspond to an element (scene, object or character) that does not exist in the real world (and obtained by alteration, as explained above). Some photographs of one or more elements that exist in the real world but do not belong to the users knowledge base may also be output. At least one of the output virtual photographs may have been obtained by altering a known photograph present in the rendered set of photographs.

Rendering 320 the puzzle also comprises rendering the statement therein on a user interface of the electronic device (vocally, textually or graphically). It is necessary for the user, in order to authenticate themselves, to enter a correct response to the statement in the puzzle.

For example, the user has to designate at least one photograph that they know from among the output photographs (by virtue of their memories, and/or their knowledge of the context of the output personal photographs or of the places and/or characters represented in the output personal photographs).

A description is given below by way of example, in connection with FIG. 6, of some embodiments of the authentication method 300 of the present application. (To facilitate reading, the references in FIGS. 3 and 5 are used for the corresponding steps that have already been introduced.)

Figure 6:
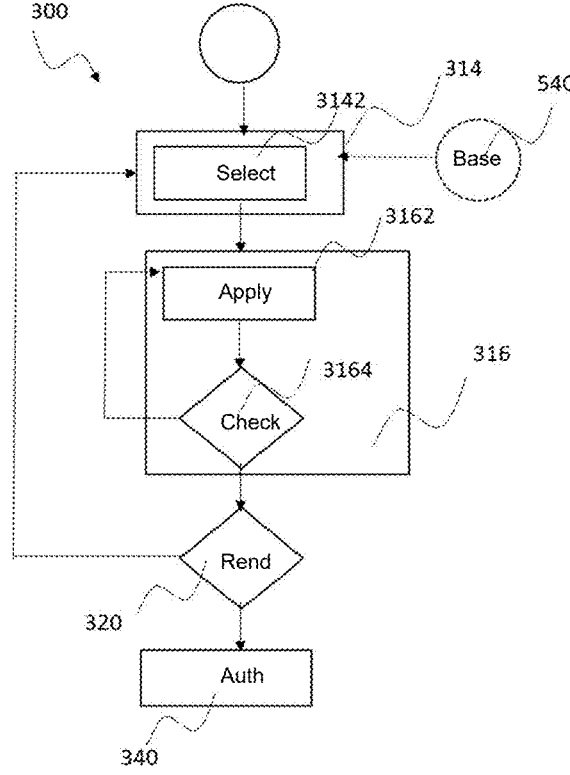

FIG. 6 illustrates certain steps 314, 316, 320, 340 of the method 300 already described above in connection with FIG. 3 in at least one embodiment leading to the rendering 320 of photographs (not all of the steps of the method 300 being illustrated for the sake of simplicity).

According to FIG. 6, obtaining a puzzle to be solved comprises obtaining 314 at least one photograph from a knowledge base obtained for example via training 500, as detailed above. Obtaining 314 at least one photograph may comprise, according to FIG. 6, automatically selecting 3142 a content element (a face in the detailed example) from the knowledge base. As explained above, this selection 3142 may take into account a frequency of occurrence of the content element in the knowledge base and features of the content element. For example, the selection 3142 may implement facial detection on the photographs in the knowledge base and/or the content elements, so as to select only faces.

As explained above, the method 300 comprises obtaining 316 at least one virtual datum. In the example of FIG. 6, the virtual datum to be obtained is a photograph obtained by altering the photograph of a face selected from the knowledge base, and obtaining 316 this photograph comprises applying 3162 a face morphing algorithm so as to slightly deform or modify at least part of the face selected from the knowledge base.

The obtaining 316 also comprises checking 3164 the coherence of the face resulting from the alteration. According to the embodiments, the face morphing algorithm may be applied one or more times, for example until the result is plausible. As already described, the method 300 then comprises rendering the puzzle to be solved. By way of illustration, rendering two photographs may comprise a first photograph of a contact of the user (a child in this example) obtained 314 from the knowledge base, and a second, virtual, photograph, obtained by retouching at least one element present in this personal photograph. Thus, by way of example, the shape of the child's nose has been modified.

The modification may be significant enough so that a person, in particular a person who knows the contact, is able to recognize the personal photograph from the virtual photograph, but plausible enough that a person who does not know (or barely knows) the contact cannot easily detect this difference, or at least fails to obviously determine which one is the virtual photograph. Thus, the child's nose in the virtual photograph remains in position, shape and proportion, adapted to the morphology of the child represented.

Figure 4:
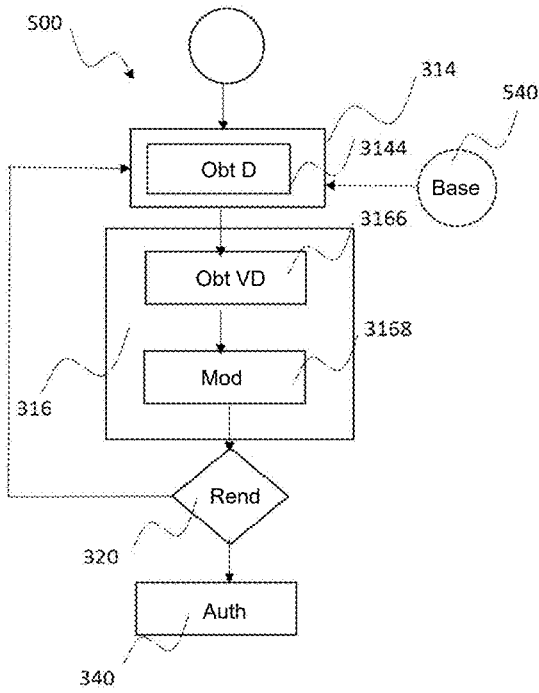

FIG. 4 illustrates some embodiments of the authentication method 300 of the present application, with another puzzle to be solved. (To facilitate reading, the reference numerals in FIG. 3 are used for the corresponding steps that have already been introduced above.)

FIG. 4 illustrates certain steps 314, 316, 320, 340 of the method 300 already described in at least one embodiment, leading to the rendering 320 of photographs (or parts of photographs). Not all of the steps of the method 300 are illustrated for the sake of simplicity.

According to FIG. 4, obtaining a puzzle to be solved comprises obtaining 314 at least one photograph or part of a photograph from the knowledge base 540 obtained via training 500, as detailed above. Obtaining 314 at least one photograph may comprise, according to FIG. 4, automatically selecting 3144 a content element from the knowledge base. As explained above, this selection 3144 may take into account a frequency of occurrence of the content element in the knowledge base and features of the content element, so as to select, in the illustrated example, only photographs comprising a landscape in the background and, in the foreground, at least one character having at least one visible particular feature, such as a visible face. The selection 3144 may in particular implement facial detection or detection of other content elements (such as particular objects) in the photographs from the knowledge base. The method may furthermore comprise selecting a portion of the selected photograph, for example a visible part (such as a face) of at least one character in the selected photograph.

As explained above, the method 300 comprises obtaining 316 at least one virtual datum. In the example of FIG. 4, one of the virtual data to be obtained is a photograph obtained by altering the photograph of a face selected from the knowledge base. In the example illustrated, the virtual photograph was obtained by removing or obscuring a portion of at least one character from the selected photograph from the knowledge base.

The method furthermore comprises obtaining 3166 at least one portion of a photograph likely to be plausibly integrated into the removed and/or obscured part of the virtual photograph, by virtue of its shape and its content for example, and possibly after a change of orientation or camera angle.

More precisely, in the example illustrated, the method may for example comprise searching, via facial detection means and an artificial intelligence module for example, for photographs comprising faces resembling the obscured face. According to the embodiments, these photographs may be searched for in the knowledge base or in an image base. In one variant, these photographs may be virtual photographs, generated by image synthesis from various real photographs. The method may comprise modifying 3168 the portions of photographs so as to make them suitable for editing with the altered photograph, in the masked or obscured area. The modification may for example relate to clipping the virtual portion, applying fading to the periphery of the portion so that it blends in with the altered photograph, changing color and/or size, and/or changing orientation or camera angle.

As already described, the method 300 then comprises rendering the puzzle to be solved. By way of illustration, rendering the virtual photograph may comprise an obscured area, as well as multiple photograph portions, one of which corresponds to the part of the known photograph obscured in the rendered altered photograph. The statement in the puzzle requests designation of the portion actually obscured in the output altered photograph (or, as a variant, designation of the portions that are not this obscured part). If the user to be authenticated took the photograph, and/or was present when the photograph was taken, and/or knows the partially removed and/or obscured character or at least one of the other characters possibly present in the photograph, they will find it easier to identify the removed and/or obscured portion than a third party.

In the embodiment of FIG. 3, the method comprises obtaining 330 a response to the rendered puzzle via an input interface of the device 200.

When the response corresponds to the expected response, the user is authenticated 340 and access is authorized (unlocked for example).

The puzzles may of course vary according to the embodiments.

According to a first example of a puzzle, multiple photographs of known and unknown people are offered to a user. Said user is asked to designate the people who belong to their contacts (or, conversely, those who do not belong to said contacts). If the user manages to recognize all of their contacts correctly (or, conversely, to identify those who do not belong to said contacts), access to the user account is unlocked.

According to a second example of a puzzle, multiple photographs representing one and the same face are offered to a user, the face being slightly modified in some photographs (eye color, hair, shape of the nose, of the ears, etc.). The user is asked to distinguish the original faces from the retouched faces.

According to a third example of a puzzle, multiple photographs of one and the same scene are offered, some photographs having been obtained by altering the background of a personal photograph of a user, the request in the puzzle being to distinguish the original photographs from the retouched photographs.

According to a fourth example of a puzzle, multiple photographs of one and the same scene are offered, all of the offered photographs having been obtained by adding characters to a known photograph (and possibly by removing others). This involves selecting the most probable virtual photograph based on the context of the scene captured in the known photograph. For example; in a family context, a photograph adding a grandfather will be considered more likely than a photograph adding a business contact.

In the embodiment of FIG. 3, when the response does not correspond to the expected response, a new puzzle is offered to the user. A new puzzle is understood to mean a puzzle having a statement and/or data different from the statement and/or data in the puzzle for which a response was expected.

Some embodiments may tolerate multiple incorrect responses to a puzzle before offering a new puzzle, and/or block the user account after multiple incorrect responses to multiple puzzles, or even make authentication conditional on solving multiple puzzles.

The method 500 for training a knowledge base 540 has been described above in connection with the method 300 for authenticating at least one user. In one variant, the method 500 for training a knowledge base may be implemented independently of the above method 300. For example, the training method may be implemented so as to build and/or enrich a knowledge base used to recommend audio content and/or image content to a user, for example a suggestion for an audio and/or image memory album.

The present application also relates to an electronic device able to implement the training method of the present application in any one of its embodiments, and also to a computer program comprising instructions for implementing the various embodiments of the above training method when the computer program is executed by a processor, and to a recording medium able to be read by an electronic device and on which the computer program is recorded.

The invention claimed is:

1. An authentication method comprising:
   providing a puzzle to be solved on at least one output user interface of an electronic device, the puzzle comprising a plurality of data comprising at least one first datum and at least one second datum, said at least one first datum and said at least one second datum being able to be rendered via the at least one output user interface and comprising an audio datum, an image datum or a combination of an audio datum and an image datum, said at least one first datum being obtained by altering at least one third datum associated with a user account, said at least one second datum being an unaltered datum associated with said user account;
   rendering a statement on the at least one output user interface with respect to the puzzle to be solved;
   receiving a designation in response to the statement, via at least one input user interface, of at least one datum of said plurality of provided data; and
   authenticating access to said user account from said electronic device on the basis of a proximity between said at least one designated datum and said at least one first datum or said at least one second datum.

2. The authentication method as claimed in claim 1, wherein the method comprises:
   obtaining said at least one second and/or third datum associated with said user account from a storage space accessible from said user account.

3. The authentication method as claimed in claim 2, wherein said obtaining of said at least one second and/or third datum associated with said user account takes into account presence, in the data from said storage space, of a content element of said second and/or third datum associated with said user account.

4. The authentication method as claimed in claim 3, wherein said obtaining said at least one second and/or third datum associated with said user account takes into account a frequency of presence of said content element in the data from said storage space.

5. The authentication method as claimed in claim 1, wherein the method comprises:
   obtaining said at least one second and/or third datum associated with said user account by taking into account a history of access to and/or history of rendering of said at least one second and/or third datum associated with said user account.

6. The authentication method as claimed in claim 1, wherein said at least one third datum associated with said user account is contained at least partially within said provided data.

7. The authentication method as claimed in claim 1, wherein the method comprises, partially rendering, on said at least one output user interface, at least one fourth datum associated with said user account and comprising an audio sequence and/or a sequence of at least one image, said plurality of provided data having a form and/or a length able to be substituted for an unrendered part of said fourth datum.

8. The authentication method as claimed in claim 7, wherein said partially rendered fourth datum is said third datum associated with said user account.

9. The authentication method as claimed in claim 1, wherein said provided first datum comprises at least a first portion not belonging to said third datum associated with said user account or vice versa.

10. The authentication method as claimed in claim 1, wherein the provided data comprise at least one fifth datum able to be inserted into said provided first datum as a substitute for an altered portion of said third datum associated with said user account in said first datum.

11. The authentication method as claimed in claim 2, wherein said method comprises obtaining, prior to said provision, data from said storage space by filtering data collected from another storage space.

12. The authentication method as claimed in claim 2, wherein said obtaining of data from said storage space comprises identifying at least one content element of at least one of said collected data.

13. The authentication method as claimed in claim 1, wherein said access to be authenticated is access to a software application accessible from said electronic device.

14. The authentication method as claimed in claim 1, wherein said access is authenticated when said designated datum corresponds to said at least one second datum.

15. The authentication method as claimed in claim 1, wherein said access is authenticated when said designated datum corresponds to said first datum.

16. The authentication method as claimed in claim 1, wherein said provision is implemented upon entry of a user identifier.

17. The authentication method as claimed in claim 1, wherein said provision is implemented in addition to a password-based authentication mechanism.

18. An electronic device comprising:
   at least one input user interface;
   at least one output user interface;
   at least one processor configured to:
   provide a puzzle to be solved on the at least one output user interface, the puzzle comprising a plurality of data comprising at least one first datum and at least one second datum, said at least one first datum and said at least one second datum being able to be rendered via the at least one output user interface and comprising an audio datum, an image datum or a combination of an audio datum and an image datum, said at least one first datum being obtained by altering at least one third datum associated with a user account, said at least one second datum being an unaltered datum associated with said user account;

rendering a statement on the at least one output user interface with respect to the puzzle to be solved;

receiving a designation in response to the statement, via the at least one input user interface, of at least one datum of said plurality of provided data; and authenticating access to said user account from said electronic device on the basis of a proximity between said at least one designated datum and said at least one first datum or said at least one second datum.

19. The electronic device as claimed in claim 18, wherein said at least one processor is configured to:

obtain said at least one second and/or third datum associated with said user account from a storage space accessible from said user account.

20. A non-transitory recording medium able to be read by a processor of an electronic device and on which there is recorded a computer program comprising instructions for implementing an authentication method when said computer program is executed by said processor, wherein the method comprises:

providing a puzzle to be solved on at least one output user interface of the electronic device, the puzzle comprising a plurality of data comprising at least one first datum and at least one second datum, said at least one first datum and said at least one second datum being able to be rendered via the at least one output user interface and comprising an audio datum, an image datum or a combination of an audio datum and an image datum, said at least one first datum being obtained by altering at least one third datum associated with a user account, said at least one second datum being an unaltered datum associated with said user account;

rendering a statement on the at least one output user interface with respect to the puzzle to be solved;

receiving a designation in response to the statement, via at least one input user interface, of at least one datum of said plurality of provided data; and authenticating access to said user account from said electronic device on the basis of a proximity between said at least one designated datum and said at least one first datum or said at least one second datum.

* * * * *